March 28, 1950　　　　J. A. OBERG　　　　2,502,231
TIP UP FISHING APPARATUS
Filed Jan. 2, 1948
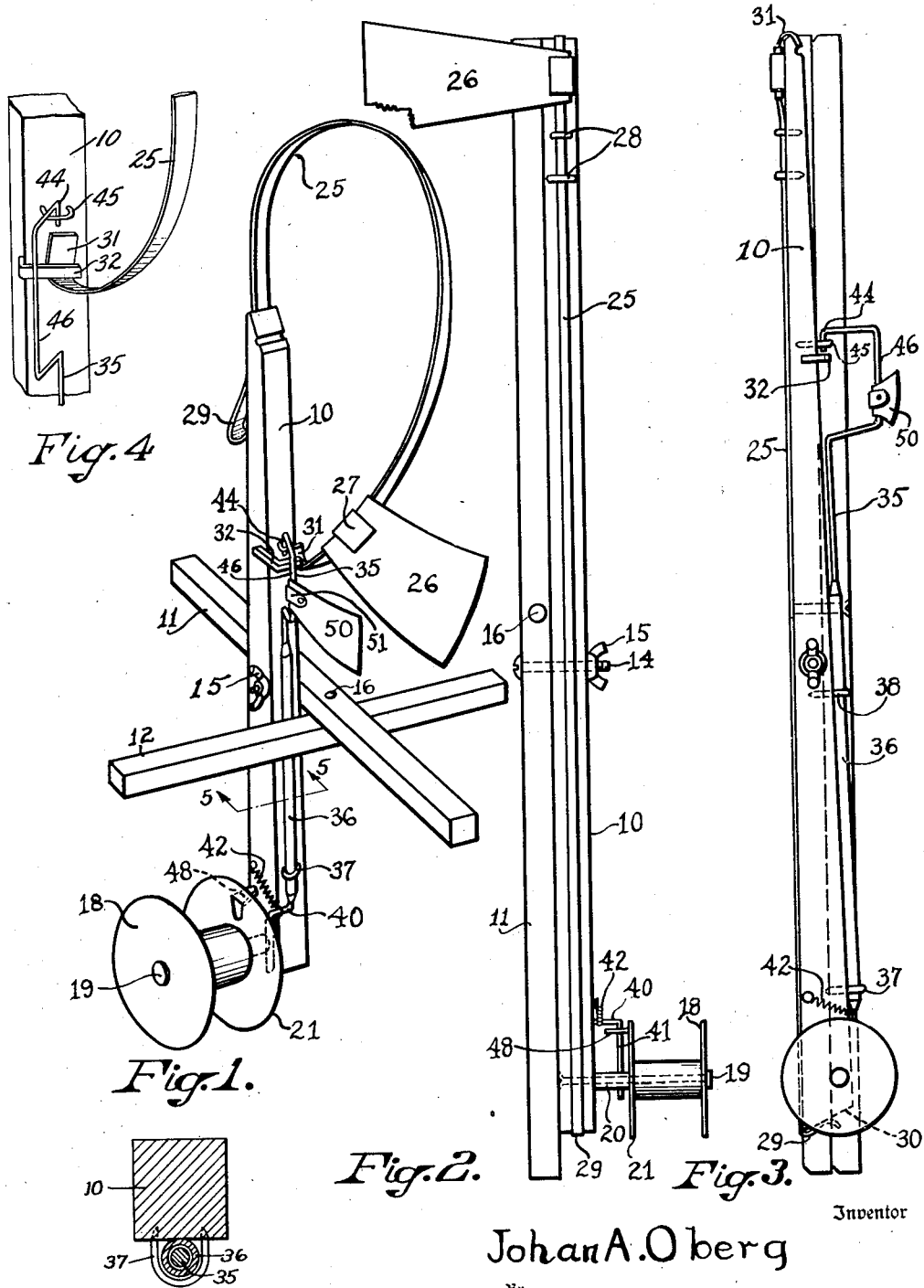
Inventor
Johan A. Oberg
By Clayton L. Jenks
Attorney Patented Mar. 28, 1950

2,502,231

UNITED STATES PATENT OFFICE 2,502,231

TIP-UP FISHING APPARATUS

Johan A. Oberg, Worcester, Mass.

Application January 2, 1948, Serial No. 315

1 Claim. (Cl. 43—17)

This invention relates to tilt-up fishing apparatus and more particularly to signalling apparatus which notifies the fisherman when a fish has been caught.

Fishing tilt-ups comprise a resilient signal arm which is bent into a loop and held there by a catch. This catch is released by mechanism operated by movement of the fish line reel when a fish hooks onto the line and rotates the reel. The signal flag may, however, be elevated to a signal position under various circumstances where no fish is attached to the line, and it is desirable that a further signal be provided which indicates that a fish is on the line. Moreover, the fishing tilt-ups heretofore provided have been so constructed that they tip over easily, and it is desirable to provide a construction which will remain substantially upright in the wind and will not be tipped over easily when a fish nibbles at the bait.

The primary object of this invention is to overcome such problems and to provide a construction in which a signal is given when a fish has become hooked and is running with the line.

A further object is to provide a support for the tilt-up which will aid in holding it upright under the normal circumstances of ice fishing.

Further objects will be apparent in the following disclosure.

Referring to the drawings illustrating one embodiment of this invention.

Fig. 1 is a perspective view, not drawn to scale, of the apparatus in the set condition when ready for fishing;

Fig. 2 is a view of the device in a folded carrying condition;

Fig. 3 is a view taken at right angles to that of Fig. 2;

Fig. 4 is a fragmentary enlarged detail view of the mechanism which releases the spring 25 from the hood 32, but with flag 50 removed for clarity of illustration; and Fig. 5 is an enlarged sectional view on the line 5—5 of Fig. 1.

This apparatus comprises a vertical upright member 10, herein termed the mast, which is supported on two cross arms 11 and 12 when located in a vertical position for ice fishing. The arm 11 is pivotally mounted on a central portion of the mast by means of a bolt 14 having a head and a clamping nut 15. The bolt 14 passes medially through the arm 11 and is so positioned relative to the upright mast that, when the reel and other parts are assembled, the major weight of the device will be below the pivots and thus the signal mast will be held vertically. The arm 12 is pivoted to the arm 11 by means of a nail or rivet 16 which is positioned on one side of the mast and spaced therefrom so that the two arms may be rotated into parallelism, as shown in Figs. 2 and 3, and be held parallel with the mast, so that the whole device may be assembled in a compact and easily-carried condition. When the clamp 15 is set tight, the mast cannot tip easily because of the cross members 11 and 12 projecting in four directions at right angles.

A standard type of fishline reel 18 made of brass or other suitable material is mounted near the bottom of the mast 10 by means of a pivot formed of a nail 19 driven through the wooden mast. A bushing 20 is located between the inner flange member 21 of the reel and the side of the mast 10 so as to hold the reel in its proper location.

A primary signal indicating that a fish has been caught is provided by the resilient flat spring wire 25 of suitable metal which carries a red felt flag 26 suitably secured by means of a metal clip 27 on the upper end of the spring member 25 This flexible flat spring wire is an extension held on the mast by means of two clips 28 that straddle it near the upper end of the mast. The lower end of the spring wire or extension 25 has a hook or loop 29 formed therein which is adapted to hook resiliently over the beveled bottom end 30 of the mast (Fig. 3) and thus hold it down in place when a further loop 31 on the upper end of the flat spring is held hooked over the top of the mast. Figs. 2 and 3 show the spring member 25 in an inoperative assembled position when the device is to be transported.

When the device is to be used for fishing, the spring member is slid upwardly through the staples 28 as far as the lower loop 29 will permit, or to the position illustrated in Fig. 1. That is, the loop 29 slides up the side of the mast until it has reached a position where its resiliency holds the spring member firmly located.

The spring member with its flag 26 is bent to the position of Fig. 1 for fishing purposes, and the upper loop 31 is hooked over a projecting L-shaped hook 32 that is secured on the side of the mast. The hook 32 is spaced from the mast by a sufficient distance to permit the loop 31 to be assembled near its free end. The L-shaped hook may be formed by driving only one leg of a staple into the mast. Any lateral movement that will slide the loop 31 off the hook 32 will permit the flag to spring upwardly to its uppermost position and thus give a signal.

The loop 31 is shoved off the hook 32 by means of a vertical rotary member 35 mounted on the side of the mast where it may be rotatively oscillated. This member is a round wire having a straight vertical portion passing through the brass sleeve 36 that is held on the side of the mast by means of staples 37 and 38. This brass member is filled with grease and has its ends tapered and sealed against the wire where it passes outwardly at its two ends, so that the grease is held permanently in position and the wire may be turned freely and not be interfered with by any ice freezing around it. It will be observed that the top of this sleeve is higher than the cross arms 11 and 12, so that the upper end of the sleeve will be above the ice and water when the device is in use. The lower end of the sleeve may rest in the water without ice forming on it, since the water below the surface will not freeze. The reel and the lower end of the mast are, of course, mounted in a hole cut through the ice, and the reel may likewise be in the water without interference by freezing ice.

The lower end of the vertical wire member 35 has an arm 40 which projects outwardly at a point just below of the brass sleeve, and this arm projects forward to a position just clearing the inner flange 21 of the reel. The arm has a downwardly dependent portion 41 which projects below the sleeve 20 that surrounds the nail 19 on which the reel is mounted. A spring 42 secured at one end to the mast and the other to the cross arm 40 holds this arm against that sleeve 20 under normal conditions. The upper part of the rotary wire member 35 has a downwardly projecting hook 44 mounted in a bearing formed by driving a staple 45 into the woodwork. This staple and the cross arm 40 are so located that the wire member 35 cannot move far enough vertically to get out of its assembled position.

The end 31 of the signal member 25 is shoved off the end of the L-shaped hook 32, as shown in Figs. 1 and 4, by means of an outwardly projecting loop 46 located just below the hooked end 44 of the vertical wire. The loop 46 is located at that side of the hook 31 which is remote from the free end of the hook 32 so that any rotary motion of the loop 46 will strike the edge of the spring wire 25 and shove the end 31 off the hook 32 thereby allowing the signal to spring upwardly to a position above the mast. This rotary motion of the wire 35 is caused by a lug 48 stamped out of the side of the flange 21 of the reel, which projects into a position where rotation of the reel by the fish pulling on the line will cause that lug 48 to strike the vertical arm 41 of the wire 35 and move it laterally and thus rotate the wire against the pull of the spring 42. This rotation of the wire thrusts the spring member 25 off its hook and allows the flag 26 to fly into an upward position and thus signal the fisherman that the reel has been disturbed.

A primary feature of this invention comprises shaping the loop 46 as illustrated and fastening a further flag 50 on that loop by means of a suitable clip 51. This flag 50, which may likewise be made of a piece of red felt, gives a secondary and important signal when the fish is running with the line. To that end, the fish line is wound on the reel in such a direction that as the lug 48 is continuously rotated, it will thrust the arm 41 outwardly and rotate the vertical arm 35 against the action of the spring 42. This constant rotation of the wire causes the flag 50 to wave back and forth and thus give a visible signal to the fisherman that a fish is drawing on the line. If a fish should pull momentarily on the line enough to release the upper flag 26 and then escape from the hook, this secondary flag 50 would not move any more, and thus the fisherman would know that the fish was not running with the line.

The operation of the device has been set forth above. It will be appreciated that the cross arms 11 and 12, which are normally carried in the positions of Figs. 2 and 3, are spread into the rectangular arrangement of Fig. 1, and the device is then mounted in a hole in the ice with the end of the flag arm 25 caught over the hook 32. When the clamp nut 15 is made tight, the arm 11 is held rigidly in place, and the cross arm 12 will have been positioned at right angles or 90° apart, and thus the two cross arms will keep the fish tilt from tipping over under normal conditions. In the fishing operation, the loop 31 on the spring member 25 is hooked over the hook 32, and the device is then ready for usage. When the fish pulls on the fish line, the reel rotates and allows the flag 26 on the spring wire to fly upwardly, and the little flag 50 will flap at a rate which is determined by the speed at which the fish is pulling on the reel. This gives a duplicate signal to the fisherman, and he can thus determine by noting the two signals as to whether a fish is on the line or has escaped.

It will be evident that various modifications may be made in this construction within the scope of my invention and the claim appended hereto.

I claim:

A fishing tilt up device comprising a mast, a resilient signal extension mounted on one side of the mast in such a position that it projects longitudinally upward therefrom, a free ended hook on the side of the mast, said extension being adapted to be bent into a loop and have its end releasably engaged by the hook, a fish line reel rotatably mounted on the mast and having a projecting lug, an oscillative rotary member having an arm projecting into the path of the lug on the rotating reel and having a projecting part which is moved laterally to release the resilient signal extension from the hook when the rotary member is turned by the reel, a spring having its ends secured to the mast and the arm respectively and arranged to return said arm into the path of the lug on the reel as the latter rotates, and a signal flag mounted on the projecting part of the oscillative member which is waved thereby when the reel is rotated.

JOHAN A. OBERG.

REFERENCES CITED

The following references are of record in the file of this patent:

UNITED STATES PATENTS

| Number | Name | Date |
| --- | --- | --- |
| 443,286 | Kunzel | Dec. 23, 1890 |
| 479,219 | Lane | July 19, 1892 |
| 1,520,556 | Beckwith | Dec. 23, 1924 |
| 2,448,346 | Baugh et al. | Aug. 31, 1948 |
| 2,451,693 | Richards | Oct. 19, 1948 |